(12) United States Patent
Kogure

(10) Patent No.: US 11,285,891 B2
(45) Date of Patent: Mar. 29, 2022

(54) ROUTING METHOD AND ROUTING STRUCTURE

(71) Applicant: YAZAKI CORPORATION, Tokyo (JP)

(72) Inventor: Naoto Kogure, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 42 days.

(21) Appl. No.: 16/938,896

(22) Filed: Jul. 24, 2020

(65) Prior Publication Data

US 2021/0061195 A1 Mar. 4, 2021

(30) Foreign Application Priority Data

Aug. 26, 2019 (JP) .............................. JP2019-153626

(51) Int. Cl.
*B62D 65/02* (2006.01)
*B60R 16/02* (2006.01)

(52) U.S. Cl.
CPC ........ *B60R 16/0215* (2013.01); *B62D 65/024* (2013.01)

(58) Field of Classification Search
CPC . B60R 16/0215; B60R 16/027; B62D 65/024; H02G 3/0468; H02G 11/00
See application file for complete search history.

(56) References Cited

U.S. PATENT DOCUMENTS

| 2013/0214099 A1 | 8/2013 | Okumura | |
|---|---|---|---|
| 2015/0325989 A1* | 11/2015 | Sekino | H02G 3/0468 |
| | | | 174/68.3 |
| 2019/0071034 A1 | 3/2019 | Oda et al. | |

FOREIGN PATENT DOCUMENTS

| EP | 3 043 434 A1 | 7/2016 |
|---|---|---|
| JP | 2019-47642 A | 3/2019 |

* cited by examiner

Primary Examiner — Rick K Chang
(74) Attorney, Agent, or Firm — Kenealy Vaidya LLP

(57) ABSTRACT

A routing method for routing a corrugated tube between a vehicle body of a vehicle and a slide door of the vehicle, the method includes providing the corrugated tube including a main body portion and a rigid portion, the rigid portion having a first end and a second end, attaching a vehicle-body-side unit to the rigid portion, the vehicle-body-side unit including a first attachment member and a first fixing member, attaching a door-side unit to the main body portion, the door-side unit including a second attachment member and a second fixing member, and adjusting a distance between the first end and a position at which the first attachment member is attached to the rigid portion in accordance with the vehicle in which the corrugated tube is routed.

4 Claims, 7 Drawing Sheets

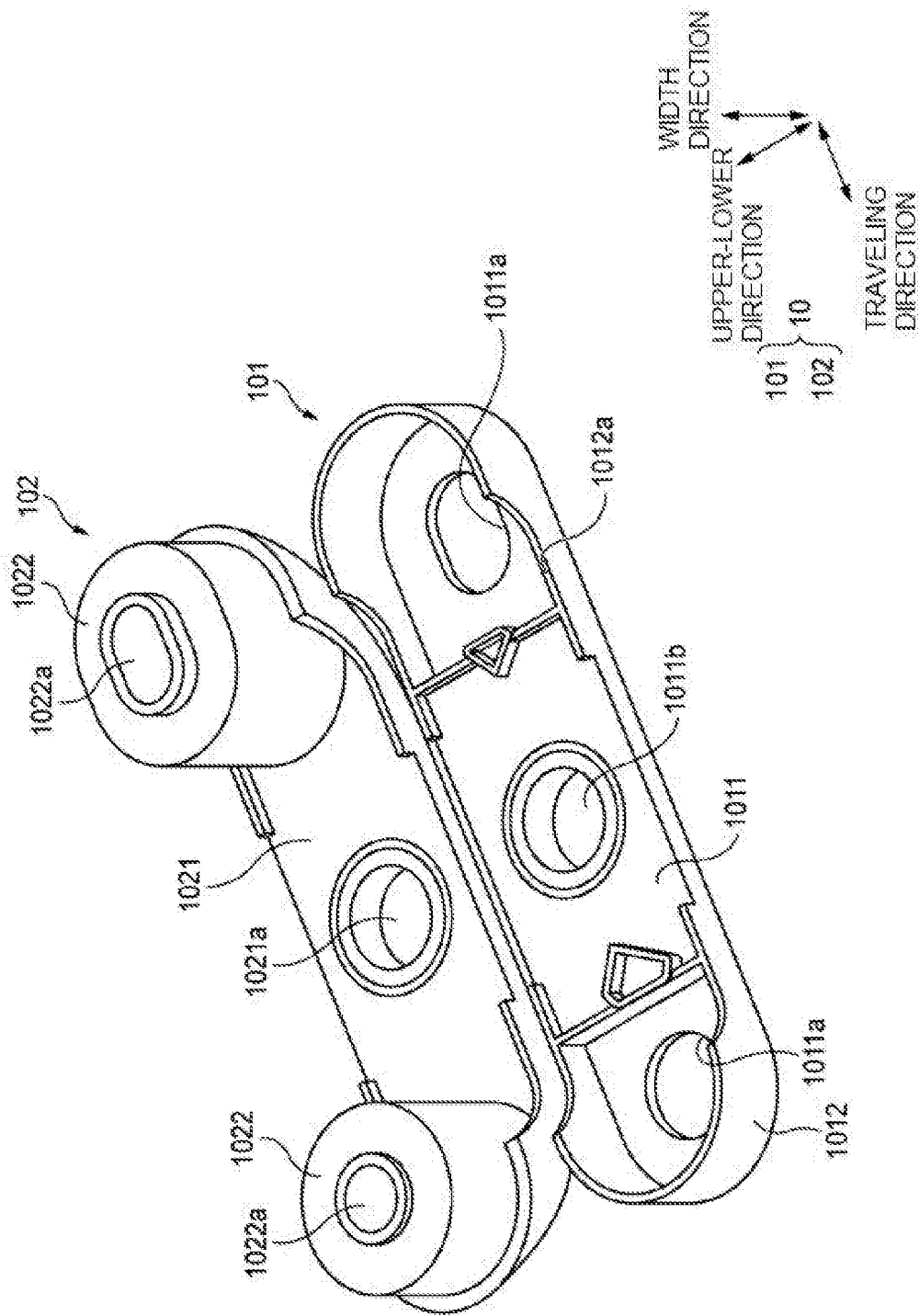

ROUTING METHOD AND ROUTING STRUCTURE

CROSS-REFERENCE TO RELATED APPLICATION

The present application claims priority to Japanese Patent Application No. 2019-153626 filed on Aug. 26, 2019, the entire content of which is incorporated herein by reference.

TECHNICAL FIELD

The present invention relates to a routing method and a routing structure of a corrugated tube.

BACKGROUND

A related art corrugated tube is provided in a tubular shape and includes a corrugated portion in which grooves and ridges extending in a circumferential direction of the tube are alternately arranged in a longitudinal direction, and a conductor path is inserted into the tube. Such a corrugated tube is used for a slide door of an automobile in a state in which an electric wire, which serves as the conductor path, is inserted into the tube. The corrugated tube is made of a synthetic resin and has a function of safely protecting the electric wire inside the tube from interference with the outside or the like.

Here, the corrugated tube used for the slide door includes a portion not to be bent and a portion to be bent. Therefore, there has been a corrugated tube in which a rigid portion having high rigidity is provided at the portion not to be bent of the corrugated tube, and a corrugated portion is provided at the portion to be bent (see JP2019-47642A, for example).

However, lengths of the portion not to be bent and the portion to be bent in the corrugated tube are different for each vehicle depending on a sliding amount, an offset amount, and the like of the slide door. Therefore, in the related art, corrugated tubes having different lengths of a rigid portion and a corrugated portion need to be provided for each vehicle. For this reason, the number of the corrugated tubes is increased, and it is necessary to prepare a large number of corrugated tubes that cannot be identified only from the appearance.

SUMMARY

Illustrative aspects of the present invention provide a routing method and a routing structure in which corrugated tubes to be arranged in a plurality of vehicles can be used in common.

According to an illustrative aspect of the present invention, a routing method for routing a corrugated tube between a vehicle body of a vehicle and a slide door of the vehicle, the method includes providing the corrugated tube including a main body portion and a rigid portion having a higher rigidity than the main body portion, the main body portion and the rigid portion being arranged in a longitudinal direction of the corrugated tube, the rigid portion having a first end and a second end, the second end being located between the first end and the main body portion, attaching a vehicle-body-side unit to the rigid portion of the corrugated tube, the vehicle-body-side unit including a first attachment member configured to be attached to the rigid portion and a first fixing member configured to support the first attachment member in a rotatable manner, the first fixing member being configured to be fixed to the vehicle body, attaching a door-side unit to the main body portion of the corrugated tube, the door-side unit including a second attachment member configured to be attached to the main body portion and a second fixing member configured to support the second attachment member in a rotatable manner, the second fixing member being configured to be fixed to the slide door, and adjusting a distance between the first end of the rigid portion and a position at which the first attachment member is attached to the rigid portion in accordance with the vehicle in which the corrugated tube is routed.

Other aspects and advantages of the invention will be apparent from the following description, the drawings and the claims.

BRIEF DESCRIPTION OF DRAWINGS

FIG. 6 is an exploded perspective view of a protector of the door-side unit shown in FIG. 1.

DETAILED DESCRIPTION

Figure 1:
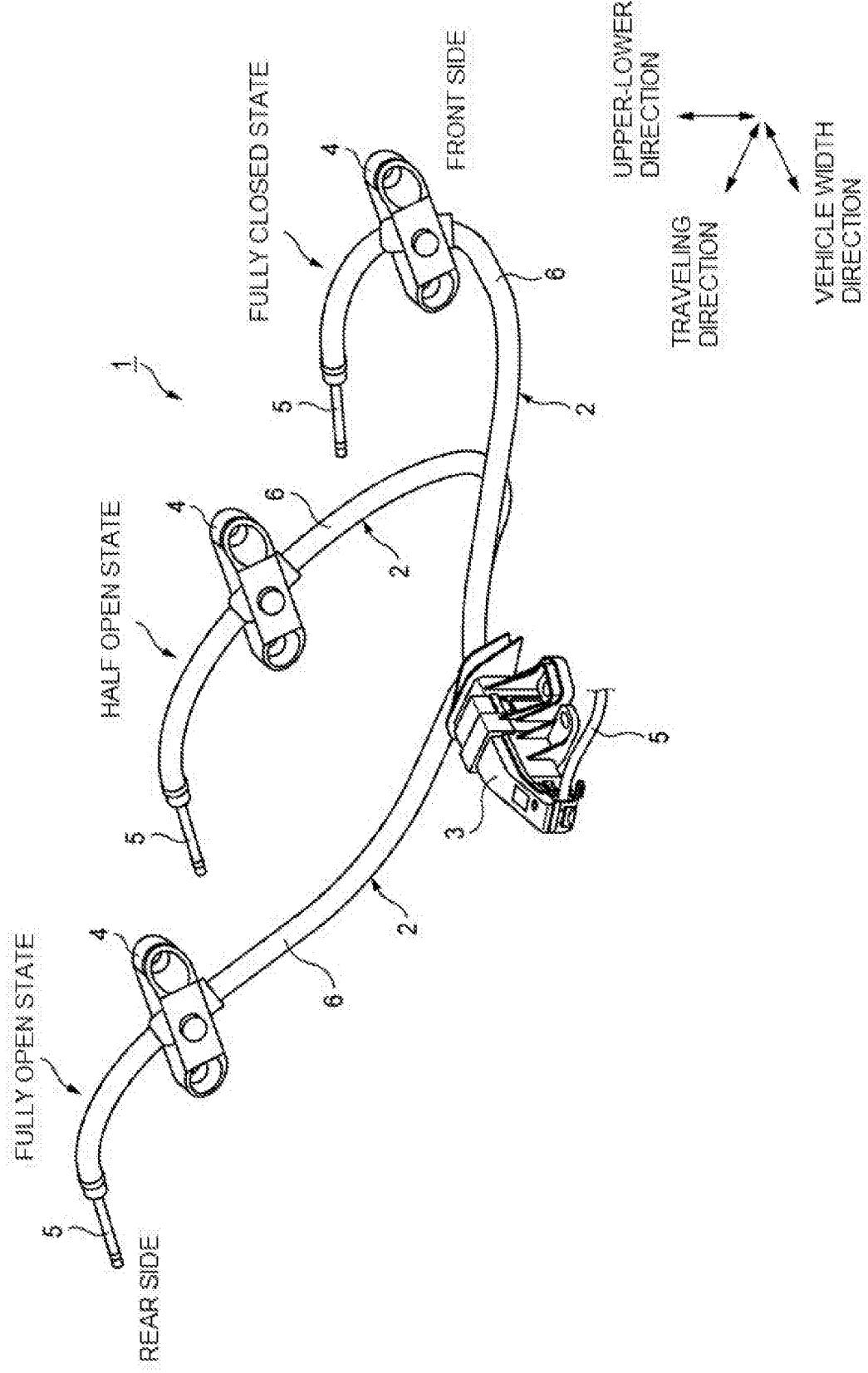
FIG. 1 is a perspective view showing an embodiment of a routing structure of the present invention.

A routing structure 1 of the present embodiment is for routing a corrugated tube 6 between a vehicle body and a slide door slidably attached to the vehicle body. As shown in FIG. 1, the routing structure 1 includes a wire harness 2, a vehicle-body-side unit 3, and a door-side unit 4. FIG. 1 shows states of the wire harness 2 in each of a fully closed state of the slide door, a half-open state, and a fully open state.

The wire harness 2 is provided between the vehicle body to the slide door, and includes a plurality of electric wires 5 and a corrugated tube 6 covering an outer periphery of the electric wires 5.

The electric wires 5 are electrically connected to a battery mounted on the vehicle body and to electric components (such as a speaker or a power window) provided on the slide door, and provided so as to supply electric power from the battery to the electric components. The electric wires 5 are longer than the corrugated tube 6, and both ends of the electric wires 5 are led out from the corrugated tube 6 and are exposed to an outside.

The corrugated tube 6 is provided in a tubular shape, and the electric wires 5 are disposed inside the tube. The corrugated tube 6 may be provided in a circular shape, or may be provided in an elliptical shape, an oval shape, or the like, or may be provided in a polygonal shape in a cross-sectional view, as long as being tubular. In addition, the corrugated tube 6 may or may not include a notch extending in a longitudinal direction through which the electric wires 5 can be inserted.

Figure 2:
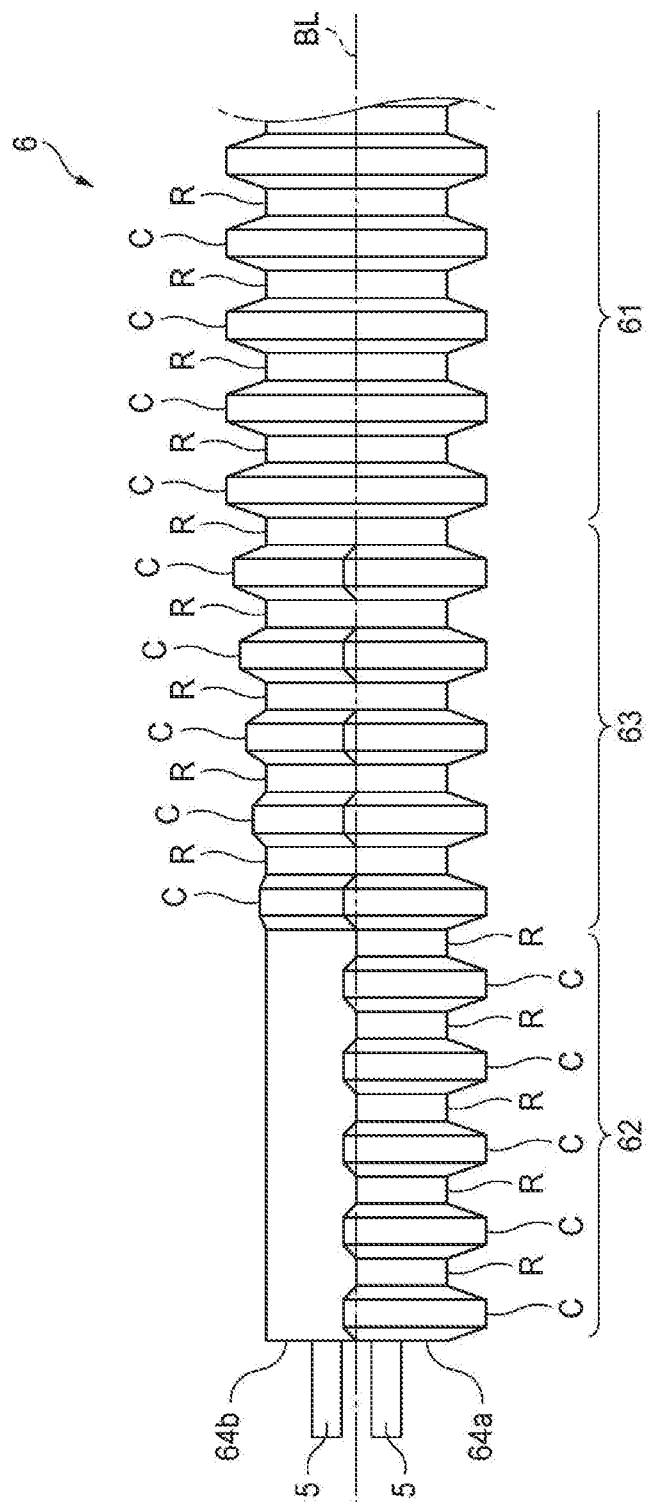
FIG. 2 is a partial side view of the corrugated tube shown in FIG. 1.

In the corrugated tube 6, as shown in FIG. 2, a corrugated portion (main body portion) 61, a rigid portion 62, and an intermediate portion 63 are arranged in the longitudinal direction. In the present embodiment, the corrugated tube 6 having the intermediate portion 63 will be described as an example, but it is not essential to include the intermediate portion 63, and the intermediate portion 63 may not be provided.

The corrugated portion 61 is a portion provided on one end side in the longitudinal direction of the tube. The corrugated portion 61 has an uneven structure in which grooves R and ridges C extending in a circumferential direction of the tube are alternately arranged in the longitudinal direction. The plurality of grooves R and ridges C arranged in the longitudinal direction in the uneven structure are respectively provided at the same heights. The grooves R and the ridges C are respectively provided at the same heights over the entire circumference of the pipe.

The rigid portion 62 is a portion provided on the other end side in the longitudinal direction of the tube. The rigid portion 62 is provided so as to have a higher rigidity than that of the corrugated portion 61. That is, similarly to the corrugated portion 61, the rigid portion 62 has an uneven structure in which grooves R and ridges C extending in the circumferential direction of the tube are alternately arranged in the longitudinal direction. In the rigid portion 62, the uneven structure is provided only in a part of the circumference of the pipe, and as in the present embodiment, is provided in a first half circumferential portion 64a lower than a boundary line BL. A remaining second half circumferential portion 64b of the pipe has a straight structure without the grooves R and the ridges C. By having the straight structure, a rigidity of the rigid portion 62 can be higher than a rigidity of the corrugated portion 61. The uneven structure of the rigid portion 62 and the uneven structure of the corrugated portion 61 have the same height and the same pitch between the adjacent ridges C.

The intermediate portion 63 is a portion provided between the rigid portion 62 and the corrugated portion 61. The intermediate portion 63 is provided so as to gradually decrease in rigidity from an end connected to the rigid portion 62 toward another end connected to the corrugated portion 61. That is, the intermediate portion 63 has an uneven structure in which the grooves R and the ridges C are alternately arranged in the longitudinal direction, and a gradually changing structure in which the height of the ridges C gradually increases from the end connected to the rigid portion 62 toward the other end connected to the corrugated portion 61. In the intermediate portion 63, the uneven structure in which the grooves and the ridges C have the same height is provided only in a part of the entire circumference of the pipe, and as in the present embodiment, is provided in the first half circumferential portion 64a lower than the boundary line BL. The gradually changing structure is provided in the remaining second half circumferential portion 64b of the tube. By having this gradually changing structure, the rigidity of the intermediate portion 63 can be gradually reduced from the rigid portion 62 toward the corrugated portion 61.

In the corrugated tube 6 as described above, the rigid portion 62 is suitable for a portion not to be bent that has the highest rigidity. The corrugated portion 61 is suitable for a portion to be bent with a predetermined bending radius R or shaper. The intermediate portion 63 is suitable for a portion to be bent blunter than the predetermined bending radius R.

Figure 3:
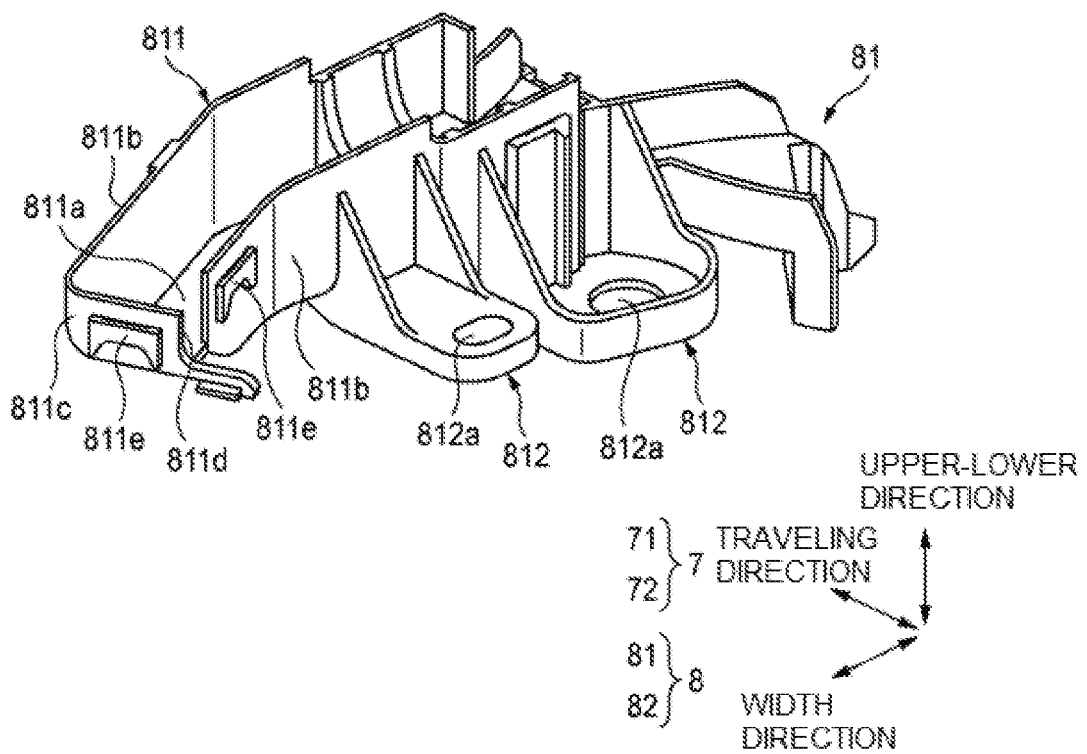
FIG. 3 is an exploded perspective view of a vehicle-body-side unit shown in FIG. 1.

The vehicle-body-side unit 3 attaches the rigid portion 62 to the vehicle body such that the rigid portion 62 is rotatable about an axis along an upper-lower direction (a radial direction of the tube). As shown in FIG. 3, the vehicle-body-side unit 3 includes a rotary inner (vehicle-body-side support portion, or first attachment member) 7 attached to the rigid portion 62, and a vehicle-body-side protector 8 (vehicle-body-side fixing portion, or first fixing member) that supports the rotary inner 7 in a rotatable manner around the axis and is fixed to the vehicle body.

Figure 4:
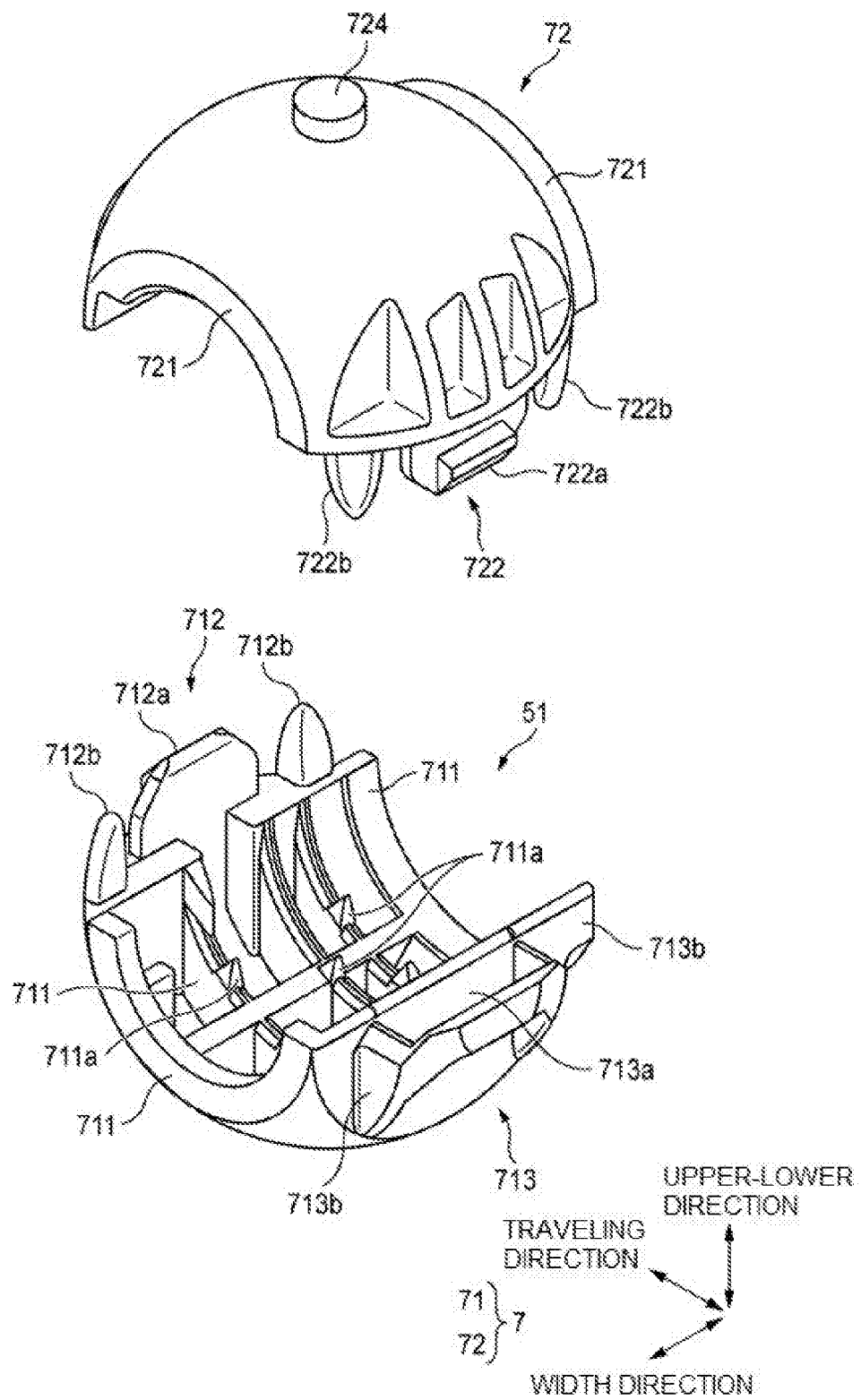
FIG. 4 is an enlarged view of a rotary inner shown in FIG. 3.

As shown in FIG. 4, the rotary inner 7 includes a lower housing 71 and an upper housing 72 (a pair of housings) that are to be attached to the corrugated tube 6 in a manner that the pair of housings sandwiching both sides of the corrugated tube 6 in the upper-lower direction. The lower housing 71 and the upper housing 72 have a common structure except for a part of the structure. First, the structure of the lower housing 71 will be described in detail. The lower housing 71 is formed in a hollow hemispherical shape as a whole. The lower housing 71 is provided with notches. The notches are formed by cutting the lower housing 71 along two parallel planes at one end side and the other end side of the lower housing 71. The corrugated tube 6 is pulled out from the notches provided at the one end and the other end of the lower housing 71. The lower housing 71 having such a shape has a plurality of ribs 711, a locking projection 712, a locking recess 713, and a protruding post 714 (FIG. 3).

The plurality of ribs 711 are provided along edges of the notches provided respectively at the one end and the other end of the lower housing 71. The plurality of ribs 711 are provided side by side in a width direction, which is being to be parallel to the longitudinal direction of the corrugated tube 6 when the corrugate tube 6 is attached to the rotary inner 7, between the one end and the other end of the lower housing 71. An upper end of the ribs 711 forms a shape of semicircular, and a radius of the semicircle is the same as or slightly smaller than a radius of the corrugated tube 6. Therefore when the rotary inner 7 is attached to the corrugated tube 6, the ribs 711 come into contact with an outer surface of the corrugated tube 6. At this time, since the ribs 711 have a dimension approximately equal to or slightly smaller than the radius of the corrugated tube 6, the ribs 711 press the corrugated tube 6 when the lower housing 71 and the upper housing 72 are assembled to each other. As a result, the corrugated tube 6 is fixed to (supported by) the rotary inner 7.

The locking projection 712 has a locking protruding piece 712a protruding from an upper end surface of the lower housing 71, and two guide protruding pieces 712b that are provided being spaced away from each other in the width direction such that the locking projection 712a is disposed between the guide protruding pieces 712b. The guide protruding pieces 712b protrude from the upper end surface of the lower housing 71. The locking recess 713 has a locking hole 713a running downward from the upper end surface of the lower housing 71, and guide holes 713b that are provided being spaced away from each other in the width direction such that the locking recess 713 is disposed between the guide holes 713b. The guide holes 713b run downward from the upper end surface of the lower housing 71. The locking protruding piece 712a and the locking hole 713a are spaced away from each other, and the locking projection 712 is positioned in one side of a traveling direction of the rotary inner 7, the traveling direction hereunder indicating a direction orthogonal both to the width direction or vehicle width direction, and an upper-lower direction, and the locking recess 713 is located on the other side.

The upper housing 72 has members that have the same shape as the locking protruding piece 712a and the guide projections 712b of the locking projection 712, and the locking hole 713a and the guide holes 713b of the locking recess 713. Specifically, the upper housing 72 includes locking protruding pieces 722a of the locking projection 722, which correspond to the locking protruding piece 712a, and guide projection 722b, which corresponds to the guide projection 712b. the corresponding locking hole and guide holes are not shown and the same reference numerals 713a and 713b will be used for the corresponding locking hole and the guide hole in the upper housing 72. When the lower housing 71 and the upper housing 72 are assembled to each other, the locking protruding pieces 712a, 722a guided by the guide protruding pieces 712b, 722b and the guide holes 713b are guided into the locking hole 713a, respectively, and the locking protruding pieces 712a, 722a and the locking hole 713a engage with each other, and the guide protruding pieces 712b, 722b and the guide holes 713b are fitted to each other.

Further, projections 71a are provided on the upper end of the ribs 711, and the projections 71a enter the grooves R of the rigid portion 62, so that a stronger pressing force can be exerted to the corrugated tube 6. As a result, the corrugated tube 6 is fixed to the rotary inner 7 firmly.

As shown in FIG. 3, the protruding post 714 is provided in a columnar shape at a topmost portion of an outer surface of the lower housing 71.

Next, the structure of the upper housing 72 will be described in detail. The upper housing 72 includes a plurality of ribs 721, a locking projection 722, a locking recess (not shown), and a protruding post 724. Since the ribs 721, the locking projection 722, and the locking recess (not shown) of the upper housing 72 have the same configuration as the ribs 711, the locking projection 712, and the locking recess 713 of the lower housing 71, detailed description thereof will be omitted.

As shown in FIG. 4, the protruding post 724 is provided in a columnar shape at a topmost portion of an outer surface of the upper housing 72. With the protruding post 724 of the upper housing 72 and the protruding post 714 of the lower housing 71 serving as a rotation shaft, the rotary inner 7 is supported by the protector 8 in a rotatable manner around the axis of the rotation shaft.

As shown in FIG. 3, the protector 8 includes a base portion 81 to be fixed to the vehicle body and a lid portion 82 to be attached to the base portion 81. The base portion 81 includes a guide portion 811, and fixing pieces 812 that protrude from one side in the traveling direction of the guide portion 811 and that are for fixing the base portion 81 to the vehicle body.

The guide portion 811 has a bottom surface portion 811a, which is long in the width direction, the bottom surface portion 811 having a first side and a second side in the width direction, the second side being a side which is closer to the slide door than the first side when assembly of a vehicle is completed, a pair of upright wall portions 811b erected from both end portions of the bottom surface portion 811a in the traveling direction, and upright wall portion 811c erected from an end portion of the bottom surface portion 811a on the first side, which is to be away from the slide door. The guide portion 811 opens toward above and at the second side. The second side hereunder also referred to as the slide door side. The corrugated tube 6 is to be inserted into the guide portion 811 from the opening on the rear side. The upright wall portions 811c is provided with a notch 811d. The electric wires 5 passing the corrugated tube 6 are to be drawn out from the notch 811d to the outside of the guide portion 811. Further, the upright wall portions 811b, 811c is provided with a locking recess 811e for locking the lid portion 82.

The fixing pieces 812 protrudes toward the traveling direction from one of the pair of upright wall portions 811b, and is provided with a fixing hole 812a into which a fixing member such as a bolt is to be inserted. In the present embodiment, two fixing pieces 812 are provided side by side in the width direction.

The lid portion 82 includes a lid portion main body 821 that covers an upper opening of the base portion 81, and a fixing piece 822 that protrudes from the lid portion main body 821. The lid portion main body 821 is provided with a locking projection 821a that is to be inserted into and locked to respective one of the locking recesses 811e of the base portion 81. The fixing piece 822 protruding toward the base portion 81 is provided with a fixing hole 822a into which a fixing member such as a bolt is to be inserted. When the base portion 81 and the lid portion 82 are assembled, the fixing pieces 812, 822 are overlapped with each other, with bolts passing the fixing holes, and fixed to the vehicle body. The base portion 81 and the lid portion 82 are respectively provided with shaft support holes (not shown) to allow the protruding posts 714, 724 of the lower housing 71 and the upper housing 72 to be inserted and pivotally supported. By fitting the protruding posts 714, 724 provided on the rotary inner 7 into the shaft support holes, the protector 8 supports the rotary inner 7 in a rotatable manner about the rotation axis along the upper-lower direction.

Figure 5:
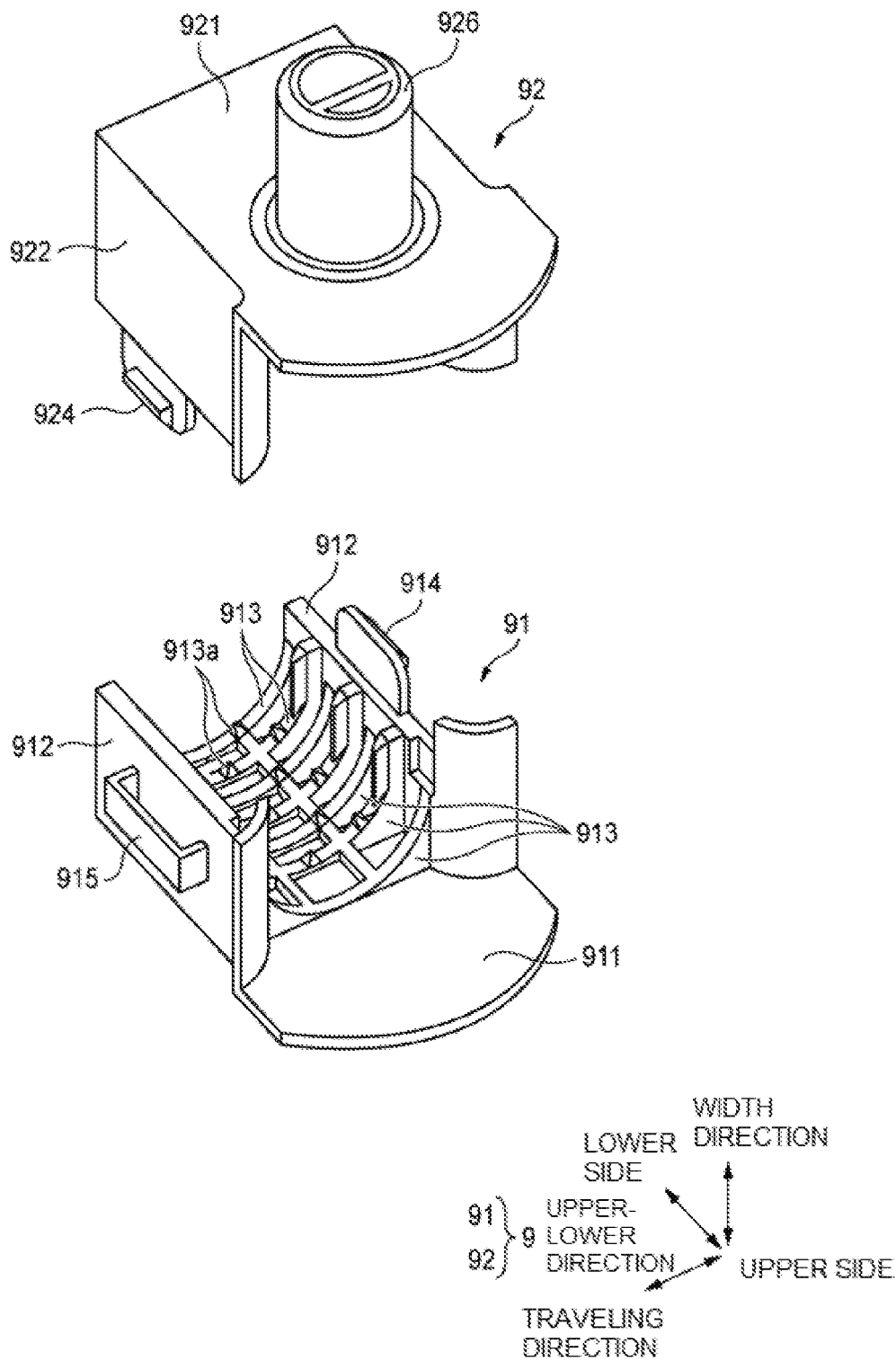
FIG. 5 is an exploded perspective view of a rotary inner of a door-side unit shown in FIG. 1.

As shown in FIGS. 5 and 6, the door-side unit 4 includes a rotary inner (door-side support portion, or second attachment member) 9 to be attached to the corrugated portion 61, and a protector (second fixing member) 10 that rotatably supports the rotary inner 9 around an axis and is fixed to the slide door.

The rotary inner 9 includes a first housing 91 and a second housing 92 (a pair of housings) that are to be attached to the corrugated tube 6 such that the first and second housings 91 an 92 sandwich the corrugated tube 6 from the both sides in the width direction. The first housing 91 and the second housing 92 have a common structure except for a part thereof. First, the structure of the first housing 91 will be described in detail. The first housing 91 includes a bottom surface portion 911, a pair of upright wall portions 912, a plurality of ribs 913, a locking projection 914, a locking recess 915, and a protruding post (not shown).

The bottom surface portion 911 is long along the upper-lower direction. The pair of upright wall portions 912 are erected from a pair of end portions of the bottom surface portion 911 in the traveling direction. The pair of upright wall portions 912 are provided from a lower end of the bottom surface portion 911 until the midway toward an upper end of the bottom surface portion 911. That is, the pair of upright wall portions 912 are not provided at the upper end of the bottom surface portion 911. The plurality of ribs 913 extend along the traveling direction and are arranged side by side in an upper-lower direction. The upper-lower direction is orthogonal to the traveling direction and the width direction. An upper end of the ribs 913 is in the shape of semicircular, and a radius of the semicircle is the same as or slightly smaller than the radius of the corrugated tube 6. Therefore when the rotary inner 9 is attached to the corrugated tube 6, the ribs 913 come into contact with an outer surface of the corrugated tube 6. At this time, since the ribs 913 have a dimension approximately equal to or slightly smaller than the radius of the corrugated tube 6, the ribs 913 contact the corrugated tube 6 in a pressed manner when the first housing 91 and the second housing 92 are attached to each other. As a result, the corrugated tube 6 is fixed to (supported by) the rotary inner 9.

The locking projection 914 protrudes from one of the pair of upright wall portions 912 toward a direction from which the second housing 92 is attached to the first housing 91. The locking recess 915 is provided on the other one of the pair of upright wall portions 912. The second housing 92 also has corresponding members that have the same shape as the locking projection 914 and the locking recess 915. More specifically, a locking projection 924 corresponds the locking projection 914 and the corresponding locking recess is not shown and the same reference numeral 915 is used for the corresponding locking recess of the second housing 92). When the first housing 91 and the second housing 92 are assembled, the locking projections 914, 924 and the locking recess 915 engage with each other.

Further, projections 913a are provided at the upper end of the ribs 913, and the projections 913a enter the grooves R of the corrugated portion 61, so that a stronger pressing force can be exerted to the corrugated tube 6. As a result, the corrugated tube 6 is fixed to the rotary inner 9 firmly.

A protruding post (not shown) protrudes from the bottom surface portion 911 in a columnar shape on an opposite side of the upright wall portions 912.

Next, the structure of the second housing 92 will be described in detail. The second housing 92 includes a bottom surface portion 921, upright wall portions 922, a plurality of ribs (not shown), a locking projection 924, a locking recess (not shown), and a protruding post 926. The bottom surface portion 921, the upright wall portions 922, the plurality of ribs (not shown), the locking projection 924, the locking recess (not shown), and the protruding post 926 of the second housing 92 have the same configuration as the bottom surface portion 911, the upright wall portions 912, the plurality of ribs 913, the locking projection 914, the locking recess 915, and the protruding column (not shown) of the above-described first housing 91, and thus a detailed description thereof is omitted here.

With the protruding post (not shown) of the first housing 91 and the protruding post 926 of the second housing 92 serving as a rotation shaft, the rotary inner 9 is supported by the protector 10 in a rotatable manner around the axis of the rotation shaft.

The protector 10 includes a third housing 101 to be provided on the slide door side and a fourth housing 102 to be overlapped with the third housing 101. The third housing 101 has a bottom surface portion 1011 that is long in the traveling direction and a peripheral wall portion 1012 erected from a peripheral edge of the bottom surface portion 1011, and is open toward the first side, a side away from the sliding door in the width direction. The bottom surface portion 1011 is to be overlapped with the slide door. The bottom surface portion 1011 is provided with a pair of fixing holes 1011a and a shaft support hole 1011b. The pair of fixing holes 1011a penetrate the bottom surface portion 1011, through both sides of the bottom surface portion 1011 in the traveling direction, and fixing members such as bosses are to be inserted therethrough. The shaft support hole 1011b is recessed and provided substantially at a center in the traveling direction of the bottom surface portion 1011. The protruding post of the first housing 91, which is not-shown, is to be inserted into the shaft support hole 1011b. In addition, a notch 1012a is provided in each one of portions of the peripheral wall portion 1012, the portions facing each other in the upper-lower direction. Both ends of the rotary inner 9 in the upper-lower direction are to protrude via the notches 1012a.

The fourth housing 102 has a bottom surface portion 1021 that is long in the traveling direction and hollow columnar portion 1022 respectively erected from both sides in the traveling direction of the bottom surface portion 1021 toward a direction from which the third housing 101 is attached to the fourth housing 102. The bottom surface portion 1021 is provided with a shaft support hole 1021a. The shaft support hole 1021a is recessed and provided substantially at the center in the traveling direction of the bottom surface portion 1011. The protruding post 926 of the second housing 92 is to be inserted therethrough. Top surfaces of the columnar portions 1022 are to be respectively overlapped with the fixing holes 1011a of the third housing 101. The top surfaces are respectively provided with fixing holes 1022a into which fixing members such as bosses are to be inserted.

Next, assembly of the routing structure 1 configured as described above will be described. First, the lower housing 71 and the upper housing 72 are assembled such that the lower housing 71 and the upper housing 72 contact both sides of the rigid portion 62 of the corrugated tube 6 in the upper-lower direction (radial direction) in a sandwiching manner. Thereafter, the rotary inner 7 attached to the rigid portion 62 is inserted into the protector 8, and at this time, the protruding posts 714, 724 of the rotary inner 7 are inserted into the shaft support holes of the protector 8 (not shown). Thereafter, the fixing members such as bosses are respectively inserted through the fixing holes 812a. 822a provided in the fixing pieces 812, 822 of the base portion 81 and the lid portion 82 to fix the protector 8 to the vehicle body.

Then, the first housing 91 and the second housing 92 are assembled such that the first housing 91 and the second housing 92 contact both sides of the corrugated portion 61 of the corrugated tube 6 in the width direction (radial direction) in a sandwiching manner. Thereafter, the rotary inner 9 attached to the corrugated portion 61 is sandwiched between the third housing 101 and the fourth housing. At this time, the protruding post 926 of the rotary inner 9 is inserted into the shaft supporting holes 1011b. 1021a of the protector 10. Thereafter, fixing members such as bosses are inserted through the fixing holes 1011a, 1022a of the protector 10 to fix the protector 10 to the slide door.

Next, a routing method using the routing structure 1 described above will be described below with reference to FIGS. 7A to 7C. As described above, the length of the rigid portion 62 varies depending on the vehicle to which the corrugated tube 6 is to be attached. This is because positions where the vehicle-body-side unit 3 and the door-side unit 4 are to be attached vary depending on the type, size, and the like of the vehicle. Therefore, in the present embodiment, a distance between an end portion T1 (first end) of the rigid portion 62 and an attachment position of the rotary inner 7, at which the rotary inner 7 is attached to the corrugated tube 6, is adjusted in accordance with the vehicle in which the corrugated tube 6 is routed. The end portion T1 (first end) is one end portion of the rigid portion 62 opposite to the other end portion (second end) of the rigid portion 62, the one end portion being away from the corrugated portion 61 than the other end portion of the rigid portion 62. In other words, the other end portion of the rigid portion 62 is located between the end portion T1 of the rigid portion 62 and the corrugated portion 61. The distance between an end portion T1 and the attachment position of the rotary inner 7 is determined and then the rotary inner 7 is attached to the rigid portion 62 at the attachment position.

Figure 7A:
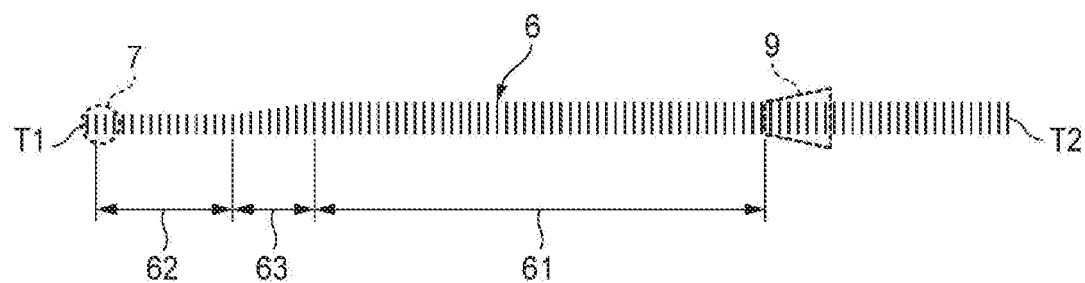
FIGS. 7A to 7C are explanatory diagrams for explaining an attachment position of the rotary inners shown in FIGS. 4 and 5 in the corrugated tube.
Figure 7B:
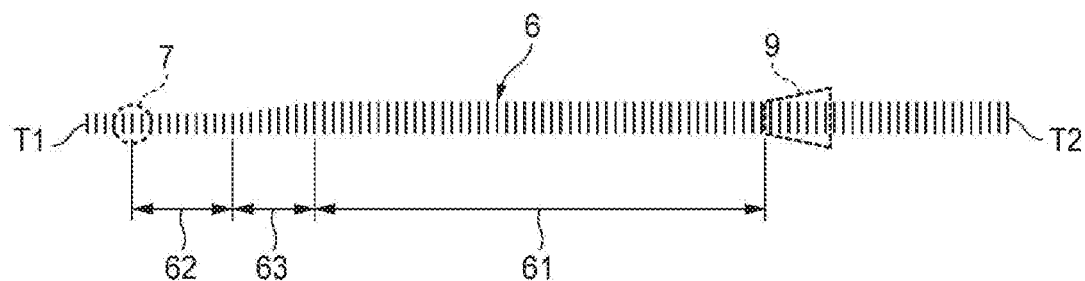
Figure 7C:
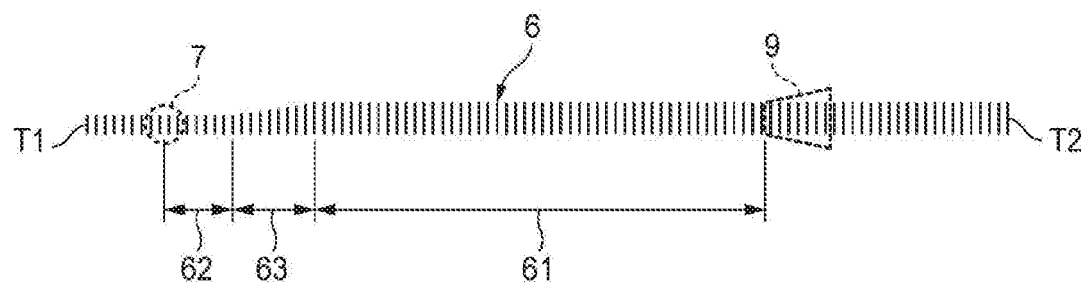

FIG. 7A shows an example in which the rotary inner 7 is attached at the end portion T1 of the rigid portion 62, and the length of the rigid portion 62 is set to be the longest among other examples. FIG. 7B is an example in which the rotary inner 7 is attached at a position slightly away from the end portion T1 of the rigid portion 62 such that the rotary inner 7 is located closer to the corrugated portion 61 than the previous example, and the length of the rigid portion 62 is slightly shortened than the previous example. FIG. 7C shows an example in which the rotary inner 7 is attached to a position further away from the end portion T1 of the rigid portion 62 such that the rotary inner 7 is located even closer to the corrugated portion 61 than the previous examples, and the length of the rigid portion 62 can be further shortened than the previous examples.

According to the embodiment described above, the length of the rigid portion 62 can be adjusted in accordance with the type, size, and the like of the vehicle without providing a corrugated tube 6 having a different length of the rigid portion 62 of the corrugated tube 6 for each vehicle. As a result, the corrugated tube 6 can be used in common to a plurality of vehicles.

According to the embodiment described above, the rotary inner 7 includes the lower housing 71 and the upper housing 72 that sandwich the corrugated tube 6 with the lower housing 71 and the upper housing 72 contacting both sides of the corrugated tube 6 in the upper-lower direction. As a result, the attachment position of the rotary inner 7 can be easily adjusted.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

In the embodiment described above, a distance between an end portion T1 of the rigid portion 62, the end portion T1 being one end portion of the rigid portion 62 away from the corrugated portion 61 than the other end portion of the rigid portion 62, and an attachment position of the rotary inner 7 is adjusted in accordance with the vehicle in which the corrugated tube 6 is routed, but ways of adjustment are not limited thereto. For example, a distance between an end portion T2 (third end) of the corrugated portion 61, the end portion T2 being one end portion of the corrugated portion 61 being opposite to the other end portion (fourth end) of the corrugated portion 61, the one end portion being away from the rigid portion 62 than the other end portion of the corrugated portion 61, and an attachment position of the rotary inner 9, at which the rotary inner 9 is to be attached to the corrugated tube 6, may be adjusted in accordance with the vehicle in which the corrugated tube 6 is routed.

In the above-described embodiment, the rigid portion 62 has an uneven structure and a straight structure, but the structure of the rigid portion 62 is not limited thereto. The rigid portion 62 may have any structure as long as the rigid portion 62 has a rigidity higher than that of the corrugated portion 61. For example, the entire rigid portions 62 may be formed by a straight structure without providing an uneven structure.

According to an aspect of the embodiments described above, a routing method for routing a corrugated tube between a vehicle body of a vehicle and a slide door of the vehicle, the method includes providing the corrugated tube including a main body portion and a rigid portion having a higher rigidity than the main body portion, the main body portion and the rigid portion being arranged in a longitudinal direction of the corrugated tube, the rigid portion having a first end and a second end, the second end being located between the first end and the main body portion, attaching a vehicle-body-side unit to the rigid portion of the corrugated tube, the vehicle-body-side unit including a first attachment member configured to be attached to the rigid portion and a first fixing member configured to support the first attachment member in a rotatable manner, the first fixing member being configured to be fixed to the vehicle body, attaching a door-side unit to the main body portion of the corrugated tube, the door-side unit including a second attachment member configured to be attached to the main body portion and a second fixing member configured to support the second attachment member in a rotatable manner, the second fixing member being configured to be fixed to the slide door, and adjusting a distance between the first end of the rigid portion and a position at which the first attachment member is attached to the rigid portion in accordance with the vehicle in which the corrugated tube is routed.

In the routing method, the main body portion may have a third end and a fourth end, the fourth end being located between the third end and the rigid portion. The method may further include adjusting a distance between the third end of the main body portion and a position at which the second attachment member is attached to the main body portion in accordance with the vehicle in which the corrugated tube is routed.

According to the routing method having the above-described configurations, the distance between the end portion of the rigid portion, i.e. the first end of the rigid portion which is away from the main body portion than the second end of the rigid portion, and the attachment position at which the vehicle-body-side attachment member is attached to the rigid portion, or the distance between the end portion of the main body portion, i.e. the third end of the main body portion which is away from the rigid portion than the fourth end of the main body portion and the attachment position at which the door-side attachment member is attached to the main body portion, is adjusted in accordance with the vehicle in which the corrugated tube is routed. Consequently, the length of the rigid portion or the main body portion can be adjusted with the vehicle without preparing a corrugated tube having a different length of the rigid portion or the main body portion of the corrugated tube even when various types of corrugated tubes having different lengths of the rigid portions and the main body portion are required for different vehicles.

At least one of the first attachment member and the second attachment member may include a pair of housings configured to be attached to the corrugated tube, the pair of housings being configured to contact, when the pair of housings are attached to the corrugated tube, two sides of the corrugated tube, such that the pair of housings sandwich the corrugated tube.

With this configuration, it is possible to easily adjust the attachment position of the vehicle-body-side attachment member or the door-side attachment member.

According to another aspect of the embodiments described above, a routing structure for routing a corrugated tube between a vehicle body and a slide door, the routing structure includes the corrugated tube including a main body portion and a rigid portion having a higher rigidity than the main body, the main body portion and the rigid portion being arranged in a longitudinal direction of the corrugated tube, the rigid portion having a first end and a second end, the second end being located between the first end and the main body portion, a vehicle-body-side unit including a first attachment member configured to be attached to the rigid portion and a first fixing member configured to support the first attachment member in a rotatable manner, the first fixing member being configured to be fixed to the vehicle body and a door-side unit including a second attachment member configured to be attached to the main body portion and a second fixing member configured to support the second attachment member in a rotatable manner, the second fixing member being configured to be fixed to the slide door. The first attachment member is configured to be attached to a position on the rigid portion other than the first end.

According to the above routing structure having the above-described configuration, the vehicle-body-side attachment member is attached to the position closer to the main body than one end of the rigid portion which is away from the main body than the other end of the rigid portion. Thus, by adjusting the distance between the one end of the rigid portion and the attachment position at which the vehicle-body-side attachment member is attached to the rigid portion in accordance with the vehicle in which the corrugated tube is routed, the length of the rigid portion can be adjusted with the vehicle.

What is claimed is:

1. A routing method for routing a corrugated tube between a vehicle body of a vehicle and a slide door of the vehicle, the method comprising:
   providing the corrugated tube comprising a main body portion and a rigid portion having a higher rigidity than the main body portion, the main body portion and the rigid portion being arranged in a longitudinal direction of the corrugated tube, the rigid portion having a first end and a second end, the second end being located between the first end and the main body portion,
   attaching a vehicle-body-side unit to the rigid portion of the corrugated tube, the vehicle-body-side unit comprising a first attachment member configured to be attached to the rigid portion and a first fixing member configured to support the first attachment member in a rotatable manner, the first fixing member being configured to be fixed to the vehicle body,
   attaching a door-side unit to the main body portion of the corrugated tube, the door-side unit comprising a second attachment member configured to be attached to the main body portion and a second fixing member configured to support the second attachment member in a rotatable manner, the second fixing member being configured to be fixed to the slide door, and
   adjusting a distance between the first end of the rigid portion and a position at which the first attachment member is attached to the rigid portion by changing a distance measured along the rigid portion that extends from the first end to the first attachment member in accordance with the vehicle in which the corrugated tube is routed.

2. The routing method according to claim 1, wherein the main body portion has a third end and a fourth end, the fourth end being located between the third end and the rigid portion, and
   wherein the method further comprises adjusting a distance between the third end of the main body portion and a position at which the second attachment member is attached to the main body portion in accordance with the vehicle in which the corrugated tube is routed.

3. The routing method according to claim 1, wherein at least one of the first attachment member and the second attachment member comprises a pair of housings configured to be attached to the corrugated tube, the pair of housings being configured to contact, when the pair of housings are attached to the corrugated tube, two sides of the corrugated tube, such that the pair of housings sandwich the corrugated tube.

4. A routing structure for routing a corrugated tube between a vehicle body and a slide door, the routing structure including:
   the corrugated tube comprising a main body portion and a rigid portion having a higher rigidity than the main body portion, the main body portion and the rigid portion being arranged in a longitudinal direction of the corrugated tube, the rigid portion having a first end and a second end, the second end being located between the first end and the main body portion;
   a vehicle-body-side unit comprising a first attachment member configured to be attached to the rigid portion and a first fixing member configured to support the first attachment member in a rotatable manner, the first fixing member being configured to be fixed to the vehicle body; and
   a door-side unit comprising a second attachment member configured to be attached to the main body portion and a second fixing member configured to support the second attachment member in a rotatable manner, the second fixing member being configured to be fixed to the slide door,
   wherein the first attachment member is configured to be attached to any one of a plurality of positions on the rigid portion other than the first end.

* * * * *